(12) United States Patent
Hümer et al.

(10) Patent No.: US 8,405,261 B2
(45) Date of Patent: Mar. 26, 2013

(54) HOUSING ATTACHMENT FOR AN ELECTRICAL MACHINE TO INGRESS PROTECTION CLASS IP 24W

(75) Inventors: Thomas Hümer, Nürnberg (DE); Ekkehard Ressel, Heilsbronn (DE); Sebastian Weiss, Oberasbach (DE)

(73) Assignee: Siemens Aktiengesellschaft, München (DE)

( * ) Notice: Subject to any disclaimer, the term of this patent is extended or adjusted under 35 U.S.C. 154(b) by 363 days.

(21) Appl. No.: 12/936,015

(22) PCT Filed: Mar. 23, 2009

(86) PCT No.: PCT/EP2009/053336
§ 371 (c)(1),
(2), (4) Date: Oct. 1, 2010

(87) PCT Pub. No.: WO2009/121734
PCT Pub. Date: Oct. 8, 2009

(65) Prior Publication Data
US 2011/0031831 A1 Feb. 10, 2011

(30) Foreign Application Priority Data

Apr. 2, 2008 (DE) .......................... 10 2008 016 889

(51) Int. Cl.
*H02K 9/18* (2006.01)
(52) U.S. Cl. .......................... 310/52; 310/59
(58) Field of Classification Search .................... 310/52, 310/55, 58, 59, 64
See application file for complete search history.

(56) References Cited

U.S. PATENT DOCUMENTS

| 4,348,604 | A | * | 9/1982 | Thode | 310/62 |
| 4,845,394 | A | * | 7/1989 | Kleinhans | 310/64 |
| 6,246,134 | B1 | * | 6/2001 | Berrong et al. | 310/52 |
| 6,262,501 | B1 | * | 7/2001 | Semba et al. | 310/52 |
| 6,750,573 | B1 | * | 6/2004 | Schmidt et al. | 310/59 |
| 7,777,374 | B2 | * | 8/2010 | Ressel | 310/59 |
| 2004/0222711 | A1 | * | 11/2004 | Klimt | 310/59 |

FOREIGN PATENT DOCUMENTS

| DE | 742 320 C | 11/1943 |
| DE | 197 15 516 C1 | 10/1998 |
| EP | 0 377 815 A2 | 11/1989 |
| WO | WO 2006/026952 A1 | 3/2006 |

* cited by examiner

*Primary Examiner* — Dang Le
(74) *Attorney, Agent, or Firm* — Henry M Feiereisen LLC

(57) ABSTRACT

A housing attachment for an electric machine is constructed in compliance with protection class IP 23 and includes a first projected edge disposed at a first border wall such that water located in the middle section at the first border wall drips off no later than at the first projected edge and is led directly or indirectly to the first air inlet opening. Proximate to the first air inlet opening are first laminates which deflect incoming air flowing into the feed air channel to a second edge area. Proximate to the second air outlet opening are second laminates that impart to the flow direction of the outgoing air leaving the outlet air channel a component directed to the top of the electric machine. Third laminates are disposed in an end area of the outlet air channel to deflect the outlet air flowing in the outlet air channel away from the top of the electric machine.

21 Claims, 2 Drawing Sheets

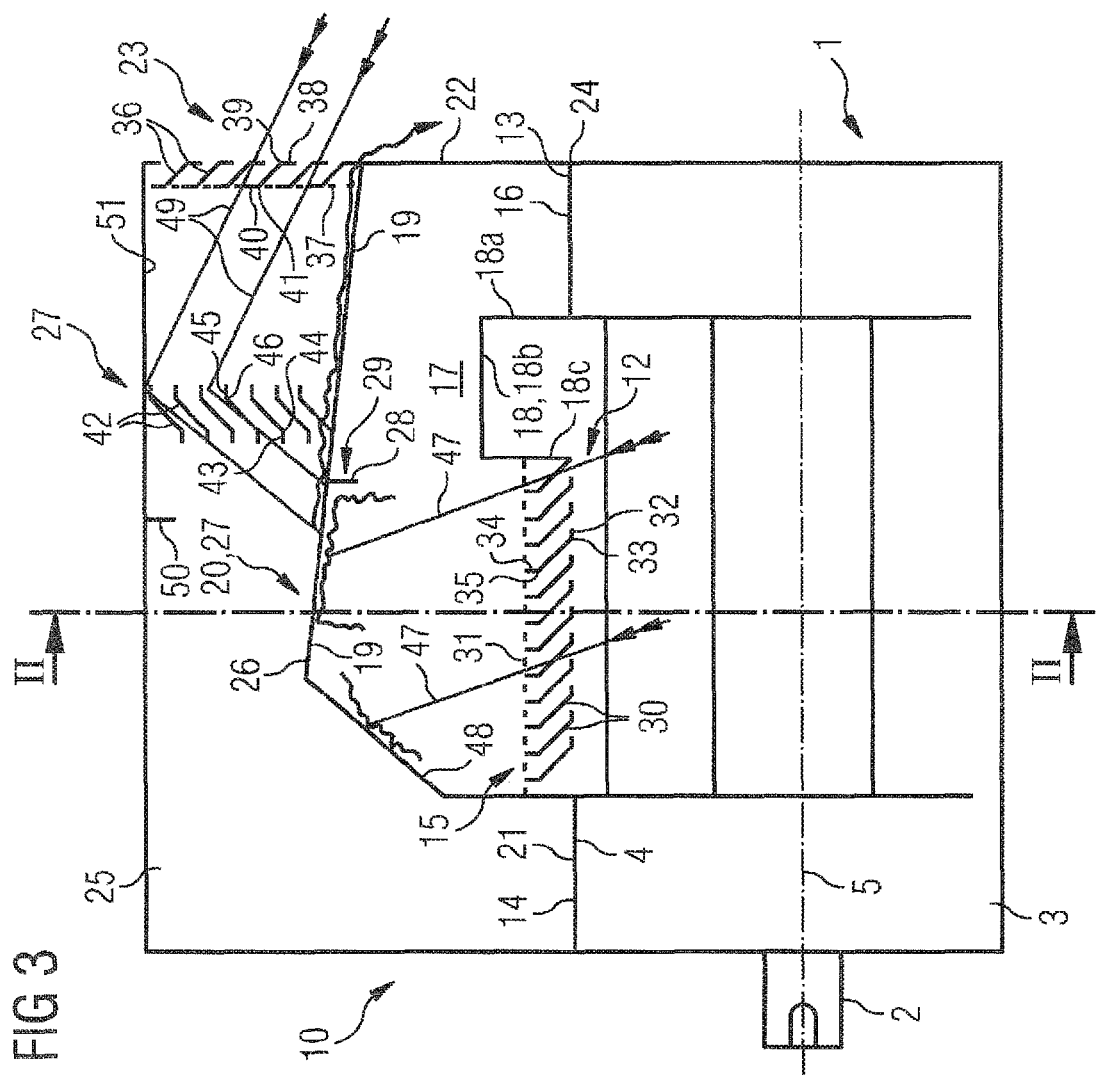
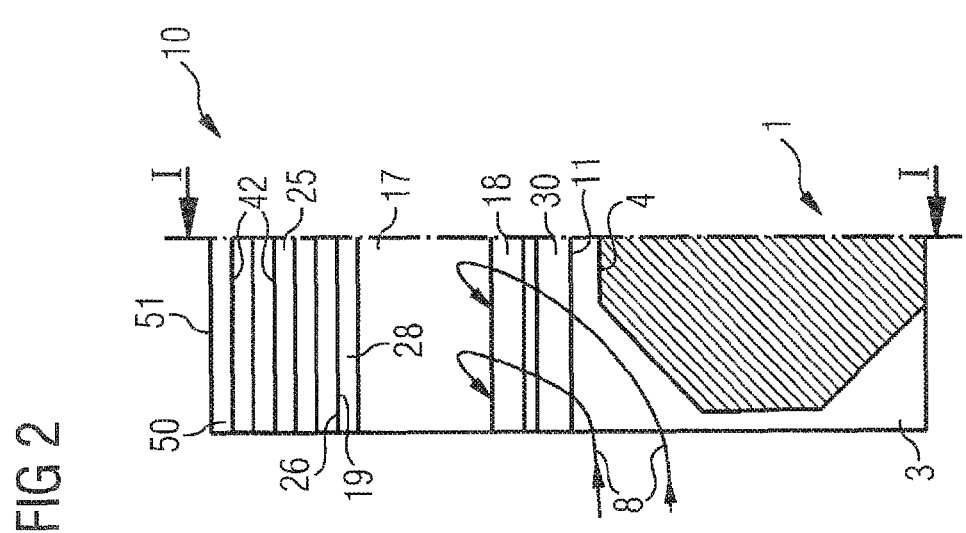

HOUSING ATTACHMENT FOR AN ELECTRICAL MACHINE TO INGRESS PROTECTION CLASS IP 24W

CROSS-REFERENCES TO RELATED APPLICATIONS

This application is the U.S. National Stage of International Application No. PCT/EP2009/053336, filed Mar. 23, 2009, which designated the United States and has been published as International Publication No. WO 2009/121734 and which claims the priority of German Patent Application, Serial No. 10 2008 016 889.0, filed Apr. 2, 2008, pursuant to 35 U.S.C. 119(a)-(d).

BACKGROUND OF THE INVENTION

The present invention relates to a housing attachment for an electrical machine,
  wherein the housing attachment has a lower face,
  wherein the lower face has a first and a second edge area by means of which the housing attachment can be placed on an upper face of the electrical machine,
  wherein the lower face has a center area which is arranged between the two edge areas and is at a distance from the upper face of the electrical machine,
  wherein the housing attachment has an inlet air channel which extends from a first air inlet opening, which is arranged in the center area, to a first air outlet opening, which is arranged in the first edge area and faces the upper face of the electrical machine, such that inlet air can be sucked in from an air inlet of the electrical machine via the inlet air channel,
  wherein a separating device is arranged in the inlet air channel between the first air inlet opening and the first air outlet opening, such that the inlet air channel runs in a U-shape or curved to an even greater extent,
  wherein the inlet air channel is bounded on its side facing away from the lower face by a first boundary wall which is inclined at least in a center section such that, seen in the flow direction of the inlet air, a distance between the first boundary wall and the first air inlet opening decreases at least as far as the separating device,
  wherein the housing attachment has an outlet air channel, which engages over the inlet air channel and extends from a second air inlet opening, which is arranged in the second edge area and faces the upper face of the electrical machine, to a second air outlet opening, such that outlet air can be blown out from an air outlet of the electrical machine via the outlet air channel,
  wherein the second air outlet opening is arranged on a high face of the housing attachment, which has a common edge with the first edge area,
  wherein the common edge is that edge of the first edge area which is furthest away from the second edge area,
  wherein the outlet air channel is bounded on its side facing the lower face by a second boundary wall which is inclined at least in an end area adjacent to the second air outlet opening such that, seen in the flow direction of the outlet air, a distance between the second boundary wall and the first air outlet opening decreases at least in the end area.

A housing attachment such as this is commercially known and already operates quite well, but offers only ingress protection class IP 23.

SUMMARY OF THE INVENTION

The object of the present invention is to develop a housing attachment of the type described above further such that it complies with ingress protection class IP 24W, while nevertheless keeping the flow resistance in the inlet air channel and in the outlet air channel as low as possible.

The object is achieved by an appliance attachment according to the invention, including in addition to the initially mentioned features of the appliance attachment the following features:
  that the housing attachment has a first drip edge, which is arranged on the first boundary wall such that water which is located on the first boundary wall in the center section drips off at the latest on the first drip edge,
  that the water which drips off on the first drip edge is passed directly or indirectly to the first air inlet opening,
  that first laminates are arranged in the area of the first air inlet opening and deflect the inlet air flowing into the inlet air channel to the second edge area,
  that second laminates are arranged in the area of the second air outlet opening which give a component directed to the upper face of the electrical machine to the flow direction of the outlet air flowing out of the outlet air channel, and
  that third laminates are arranged in the end area in the outlet air channel and deflect the outlet air flowing in the outlet air channel away from the upper face of the electrical machine.

In one preferred refinement of the housing attachment, the first laminates are bent at least once. This results in them being more robust. In particular, it is possible that the first laminates have a bend at their ends facing the upper face of the electrical machine, on the basis of which those ends of the first laminates which face the upper face of the electrical machine run essentially parallel to the upper face of the electrical machine. Alternatively or additionally, it is possible that the first laminates have a bend at their ends remote from the upper face of the electrical machine, on the basis of which those ends of the first laminates which are remote from the upper face of the electrical machine run essentially orthogonally to the upper face of the electrical machine.

The second laminates can likewise be bent at least once. One preferred refinement for this purpose provides that the second laminates have a bend at their ends facing the upper face of the electrical machine, on the basis of which those ends of the second laminates which face the upper face of the electrical machine run essentially orthogonally to the upper face of the electrical machine. Alternatively or additionally, it is possible that the second laminates have a bend at their ends which are remote from the upper face of the electrical machine, on the basis of which those ends of the second laminates which are remote from the upper face of the electrical machine run essentially orthogonally to the upper face of the electrical machine.

The third laminates can likewise be bent at least once. One preferred refinement for this purpose provides that the third laminates have a bend at their ends facing the upper face of the electrical machine, on the basis of which those ends of the third laminates which face the upper face of the electrical machine run essentially parallel to the upper face of the electrical machine. Alternatively or additionally, it is possible that the third laminates have a bend at their ends remote from the upper face of the electrical machine, on the basis of which those ends of the third laminates which are remote from the upper face of the electrical machine run essentially parallel to the upper face of the electrical machine.

In a further preferred refinement, the first boundary wall is identical to the second boundary wall. This results in the housing attachment having a physically simple design.

In one preferred refinement of the present invention, the inlet air channel has a larger cross section in the area of the first air inlet opening than in the area of the first air outlet opening. This measure makes it possible to reduce the flow resistance even further.

One particularly preferred refinement of the present invention provides that the housing attachment has a second drip edge which, seen in the flow direction of the outlet air, is arranged in the end area in front of the second laminates on a third boundary wall, which is opposite the second boundary wall, such that water which is located in the end area drips off at the latest on the second drip edge onto the second boundary wall. The second drip edge can in this case be arranged in front of the third laminates, seen in the flow direction of the outlet air.

It is possible that the separating device is in the form of a web which projects into the inlet air channel. Alternatively, it is possible that the separating device is in the form of a projection which projects into the inlet air channel. In the last-mentioned case, the projection may, in particular, be in the form of a step.

It is possible for the first air inlet opening to be at a distance from the first edge area. Alternatively, the first air inlet opening can extend to the first edge area.

In one preferred refinement of the present invention, the separating device has a drain area which is adjacent to the first air inlet opening and is inclined toward the first air inlet opening. In this case, the first drip edge can be arranged such that the water which drips off the first drip edge drips onto the inclined drain area. Alternatively, it is possible that, seen in the flow direction of the inlet air, the first drip edge is arranged in a transitional area from the first air inlet opening to the separating device.

BRIEF DESCRIPTION OF THE DRAWING

Further advantages and details will become evident from the following description of one exemplary embodiment and in conjunction with the drawings, in which, illustrated in outlined form:

FIG. 2 shows a further section illustration of the electrical machine and of the housing attachment shown in FIG. 1, and FIG. 3 shows, schematically, the method of operation of laminates in the housing attachment according to the invention, in order to achieve ingress protection class IP 24W.

DETAILED DESCRIPTION OF PREFERRED EMBODIMENTS

Figure 1:
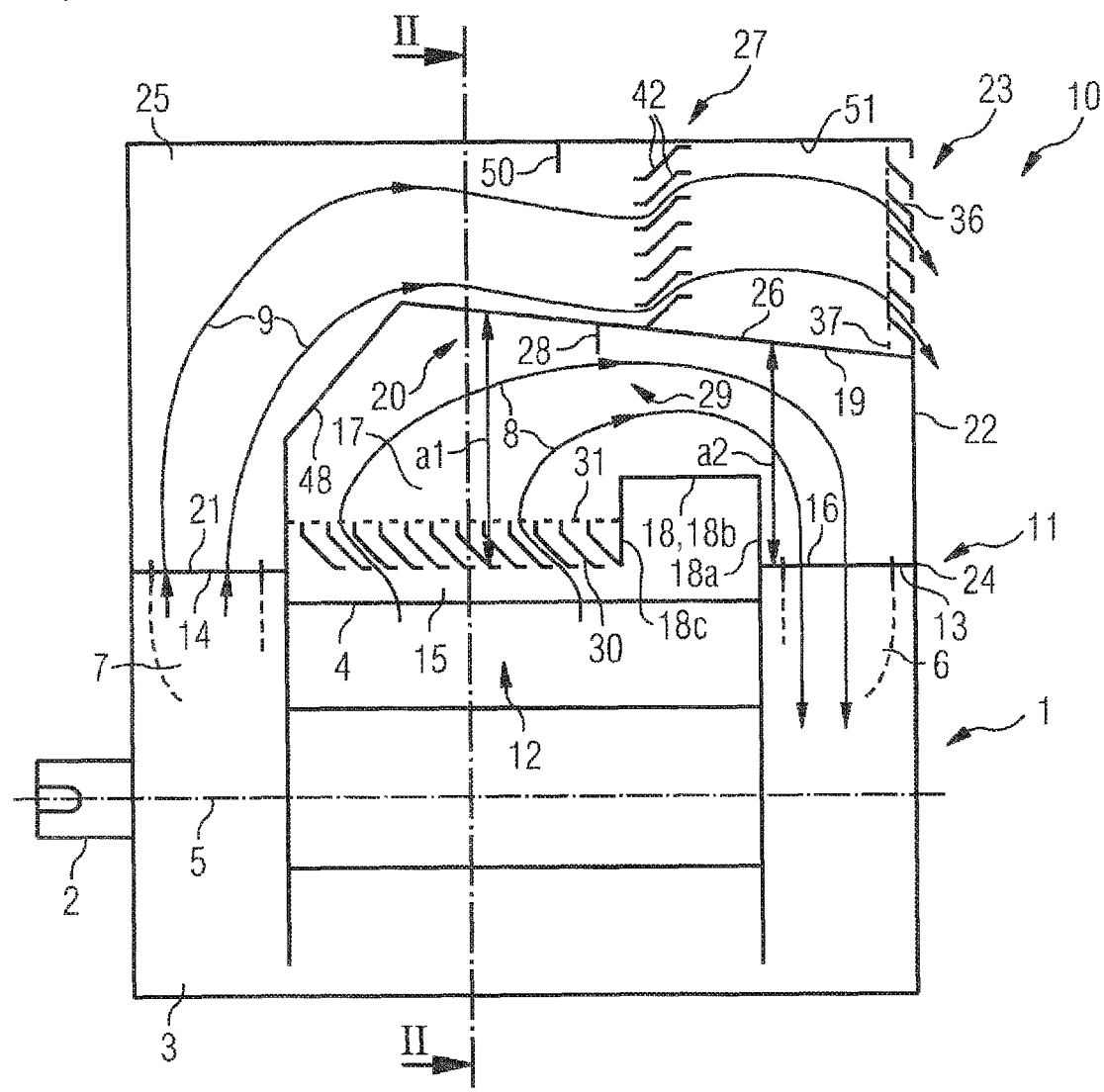
FIG. 1 shows a section illustration of an electrical machine and of an appliance attachment.

In FIGS. 1 and 2, an electrical machine 1 is arranged horizontally. The term "arranged horizontally" in this case means that a rotor shaft 2 of the electrical machine 1 runs horizontally. The electrical machine 1 has a machine housing 3 which itself has an upper face 4. An air inlet 6 and an air outlet 7 of the electrical machine 1 are located on the upper face 4, axially offset with respect to one another—with respect to a rotation axis 5 of the rotor shaft 4. The electrical machine 1 sucks in inlet air 8 via the air inlet 6. It passes the inlet air 8 through the electrical machine 1 in order to cool the electrical machine 1. The air which has passed through the electrical machine 1 is blown out by the electrical machine 1 via the air outlet 7 as outlet air 9.

Solid foreign bodies and water can enter the electrical machine 1 via the air inlet 6 and the air outlet 7. In order to prevent this (within limits), a housing attachment 10 is provided. The housing attachment 10 is in this case intended to comply with ingress protection class IP 24W. The housing attachment 10 is therefore intended to ensure the following (in accordance with IEC 60034-5):

It is intended to ensure protection against ingress of solid bodies with a diameter of more than 12 mm.

It is intended to ensure protection against the ingress of water projected by a nozzle and relatively small particles at high speed from all directions, there should be an area in the induction manifold in which the air speed does not exceed 3 ms.

There should be three 90° direction changes in the induction manifold.

In order to comply with these conditions and nevertheless to keep the air resistance as low as possible, the housing attachment 10 as shown in FIGS. 1 and 2 is designed as follows:

The housing attachment 10 has a lower face 11 which itself has a center area 12 and two edge areas 13, 14, which are adjacent to the center area 12 on both sides. The center area 12 is therefore arranged between the edge areas 13, 14. The edge areas 13, 14 of the housing attachment 10 are placed on the upper face 4 of the electrical machine 1. In contrast, the center area 12 is separated from the upper face 4 of the electrical machine 1.

A first air inlet opening 15 is arranged in the center area 12. The first air inlet opening 15 faces the upper face 4 of the electrical machine 1, but is at a distance from the upper face 4 of the electrical machine 1. The first air inlet opening 15 may be at a distance from the second edge area 14. However, it is likewise possible for it to be adjacent to the second edge area 14.

A first air outlet opening 16 is arranged in the first edge area 13 and likewise faces the upper face 4 of the electrical machine 1. The first air outlet opening 16 interacts with the air inlet 6 of the electrical machine 1.

The housing attachment 10 has an inlet air channel 17 which extends from the first air inlet opening 15 to the first air outlet opening 16. This configuration allows the inlet air 8 to be sucked in from the air inlet 6 of the electrical machine 1 via the inlet air channel 17.

A separating device 18 is arranged in the inlet air channel 17 between the first air inlet opening 15 and the first air outlet opening 16. The inlet air channel 17 therefore runs in a U-shape or is curved to an even greater extent. In this case, the air inlet channel 17 preferably has a larger cross section in the area of the first air inlet opening 15 than in the area of the first air outlet opening 16.

As shown in FIG. 1, the separating device 18 is in the form of a projection 18, which projects into the inlet air channel 17. In this case, the first air inlet opening 15 is at a distance from the first edge area 13, since the projection 18 separates the first air inlet opening 15 from the first edge area 13. The projection 18 may be in the form of a step 18. However, other refinements of the projection 18 are also possible, for example as a dome-like bulge.

As an alternative to the embodiment as a projection 18, the separating device could also be in the form of a web projecting into the inlet air channel 17. In this case, the web may alternatively be straight or bent. In particular, it is therefore possible for the separating device to consist, for example, exclusively of a side surface 18a of the projection 18 or for the separating device to have the side surface 18a and a further side surface 18b but not, in contrast, a side surface 18c of the projection 18. When the separating device is in the form of a web, the first air inlet opening 15 can extend as far as the first edge area 13.

The inlet air channel 17 is bounded on a side which is remote from the lower face 11 by a first boundary wall 19. The first boundary wall 19 is inclined at least in a center section 20. This results in a distance a1 between the first boundary wall 19 and the first air inlet opening 15 decreasing at least as far as the separating device 18.

A second air inlet opening 21 is arranged in the second edge area 14. The second air inlet opening 21 faces the upper face 4 of the electrical machine 1 and interacts with the air outlet 7 of the electrical machine 1. A second air outlet opening 23 is arranged on a high face 22 of the housing attachment 10. The high face 22 is defined by having a common edge 24 with the first edge area 13. The common edge 24 is in this case that edge of the first edge area 13 which is furthest away from the second edge area 14.

The housing attachment 10 has an outlet air channel 25 which extends from the second air inlet opening 21 to the second air outlet opening 23 and thus engages over the inlet air channel 17. This configuration allows the outlet air 9 to be blown out from the air outlet 7 of the electrical machine 1 via the outlet air channel 25.

On its side facing the lower face 11, the outlet air channel 25 is bounded by a second boundary wall 26. The second boundary wall 26 is inclined at least in an end area 27 adjacent to the second air outlet opening 23. This means that, seen in the flow direction of the outlet air 9, a distance a2 between the second boundary wall 26 and the first air outlet opening 16 decreases at least in the end area 27.

The second boundary wall 26 may be a specific boundary wall, which is not the same as the first boundary wall 19. However, the first boundary wall 19 is preferably identical to the second boundary wall 26.

The housing attachment 10 furthermore has a first drip edge 28. The first drip edge 28 is arranged on the first boundary wall 19 such that the first drip edge 28 projects from above into the inlet air channel 17. Seen in the flow direction of the inlet air 8, the first drip edge 28 may in this case be arranged in a transitional area 29 from the first air inlet opening 15 to the separating device 18. This arrangement in conjunction with the inclined arrangement of the first boundary wall 19 means that water which is located in the center section 20 on the first boundary wall 19 drips off at the latest on the first drip edge 28, and is carried directly to the first air inlet opening 15.

Alternatively, it is possible for the side surface 18b which is adjacent to the first air inlet opening 15 to be inclined. In this case, the side surface 18b is in the form of a drain area 18b. In this case, the first drip edge 28 can be arranged such that the water which drips off the first drip edge 28 first of all drips onto the inclined drain area 18b, from where it is carried to the first air inlet opening 15. In this case, the water which drips off on the first drip edge 28 is carried indirectly to the first air inlet opening 15.

First laminates 30 are arranged in the area of the first air inlet opening 15. The first laminates 30 deflect the inlet air 8 flowing into the inlet air channel 17 toward the second edge area 14. In individual cases, it may in this case be sufficient to arrange exclusively the first laminates 30 in the area of the first air inlet opening 15. In contrast, in general, a mesh grid 31 with a grid width of at most 12 mm is additionally arranged in the area of the first air inlet opening 15.

In one preferred refinement of the present invention, the first laminates 30 are bent at least once. This measure makes it possible to make the first laminates 30 more mechanically robust. At the same time, this makes it possible to reduce the susceptibility of the first laminates 30 to oscillations and vibration during operation.

By way of example, the first laminates 30 may have a first bend 33 at their ends 32 facing the upper face 4 of the electrical machine 1. Because of the first bend 33, those ends 32 of the first laminates 30 which face the upper face 4 of the electrical machine 1 run essentially parallel to the upper face 4 of the electrical machine 1.

Alternatively or additionally, the first laminates 30 may have a second bend 35 at their ends 34 which are remote from the upper face 4 of the electrical machine 1. Because of the second bend 35, those ends 34 of the first laminates 30 which are remote from the upper face 4 of the electrical machine 1 run essentially orthogonally to the upper face 4 of the electrical machine 1.

Furthermore, second laminates 36 are arranged in the area of the second air outlet opening 23. The second laminates 36 give the flow direction of the outlet air 9, as it flows out of the outlet air channel 25, a component which is directed at the upper face 4 of the electrical machine 1. In individual cases, it may be sufficient in this case to arrange exclusively the second laminates 36 in the area of the second air outlet opening 23. In general, however, a mesh grid 37 with a grid width of at most 12 mm is additionally arranged in the area of the second air outlet opening 23.

Analogously to the first laminates 30, the second laminates 36 may also be bent at least once. This achieves the same effects for the second laminates 36 as for the first laminates.

By way of example, the second laminates 36 may have a first bend 39 at their ends 38 facing the upper face 4 of the electrical machine 1. Because of the first bend 39, those ends 38 of the second laminates 36 which face the upper face 4 of the electrical machine 1 run essentially orthogonally to the upper face of the electrical machine 1.

Alternatively or additionally, the second laminates 36 may have a second bend 41 at their ends 40 which are remote from the upper face 4 of the electrical machine 1. Because of the second bend 41, those ends 40 of the second laminates 36 which are remote from the upper face 4 of the electrical machine 1 run essentially orthogonally to the upper face 4 of the electrical machine 1.

Finally, third laminates 42 are arranged in the outlet air channel 25. The third laminates 42 deflect the outlet air 9 flowing in the outlet air channel 25 away from the upper face 4 of the electrical machine 1.

Analogously to the first and the second laminates 30, 36, the third laminates 42 may also be bent at least once. This results in the same effects for the third laminates 42 as those already mentioned for the first and second laminates 30, 36.

By way of example, the third laminates 42 may have a first bend 44 at their ends 43 facing the upper face 4 of the electrical machine 1. Because of the first bend 44, those ends 4 of the third laminates 42 which face the upper face 4 of the electrical machine 1 run essentially parallel to the upper face 4 of the electrical machine 1.

Alternatively or additionally, the third laminates 42 may have a second bend 46 at their ends 45 which are remote from the upper face 4 of the electrical machine 1. Because of the second bend 46, those ends 45 of the third laminates 42 which are remote from the upper face 4 of the electrical machine 1 run essentially parallel to the upper face 4 of the electrical machine 1.

Because of the first laminates 30, water 47 projected by a nozzle can enter the inlet air channel 17 only in a very narrow angle range, see FIG. 3. The water 47 which enters after being projected by a nozzle in this case either strikes the inclined section of the first boundary wall 19 or an intermediate wall 48 which is adjacent to the first boundary wall 19 toward the second edge area 14. If the water 47 projected by a nozzle strikes the inclined section of the first boundary wall 19, it either drips directly onto the first air inlet opening 15 or runs to the first drip edge 28, from where it drips onto the first air inlet opening 15. If the water 47 projected by a nozzle strikes the intermediate wall 48, it runs away directly toward the first air inlet opening 15.

The second laminates 36 analogously mean that water 49 projected by a nozzle can enter the outlet air channel 25 only in a very narrow angle range. The water 49 which has entered having been projected by a nozzle strikes the third laminates 42. From there, it sprays in the end area 27 onto the second boundary wall 26, or drips onto the second boundary wall 26 in front of the third laminates 42 and thus likewise in the end area 27. Because of the inclined arrangement of the second boundary wall 26, the water 49 projected by a nozzle then runs away out of the outlet air chamber 25.

The housing section 10 may have a second drip edge 50 in order to provide even better protection against the ingress of water. If the second drip edge 50 is present, it is arranged, as seen in the flow direction of the outlet air 9, in front of the second laminates 36 on a third boundary wall 51, which is opposite the second boundary wall 26. This means that water 49 which is located in the end area 27 drips onto the second boundary wall 26 at the latest on the second drip edge 50. The second drip edge 50 is in this case preferably arranged in front of the third laminates 42, seen in the flow direction of the outlet air 9.

The housing attachment 10 designed according to the invention makes it possible to comply in a simple manner with ingress protection class IP 24W, while nevertheless keeping the air resistance low.

The above description is intended only to explain the present invention. The scope of protection of the present invention is intended, in contrast, to be governed exclusively by the attached claims.

What is claimed is:

1. A housing attachment for an electrical machine, comprising:
a housing body having a lower face having first and second edge areas for placement on an upper face of an electrical machine, with one of the first and second edge areas having a first air outlet opening facing the upper face of the electrical machine, said lower face defining a center area arranged between the first and second edge areas at a distance from the upper face of the electrical machine and having a first air inlet opening, said housing body having an inlet air channel and an outlet air channel, said inlet air channel extending from the first air inlet opening to the first air outlet opening for drawing inlet air from an air inlet of the electrical machine and being bounded on a side facing away from the lower face by a first boundary wall, said outlet air channel being bounded on a side facing the lower face of the housing body by a second boundary wall and spanning over the inlet air channel to extend from a second air inlet opening, arranged in the other one of the first and second edge areas and facing the upper face of the electrical machine, to a second air outlet opening for blowing out outlet air from an air outlet of the electrical machine, said second air outlet opening arranged on a high face of the housing body, with the high face defining with the one of the first and second edge areas a common edge which is located furthest away from the other one of the first and second edge areas;
a separating device arranged in the inlet air channel between the first air inlet opening and the first air outlet opening so that the inlet air channel receives a U-shaped or curved configuration, wherein the first boundary wall is inclined at least in a center section thereof to thereby define between the first boundary wall and the first air inlet opening in a flow direction of the inlet air a first distance which decreases at least towards the separating device, wherein the second boundary wall is inclined at least in an end area of the housing body adjacent to the second air outlet opening, thereby defining between the second boundary wall and the first air outlet opening in a flow direction of the outlet air a second distance which decreases at least in the end area, said housing body having a first drip edge arranged on the first boundary wall to permit water present in the center section of the first boundary wall to drip off and to flow directly or indirectly to the first air inlet opening;
a plurality of first laminates arranged in an area of the first air inlet opening to deflect the inlet air flowing into the inlet air channel to the other one of the first and second edge areas;
a plurality of second laminates arranged in an area of the second air outlet opening to impose on the flow direction of the outlet air flowing out of the outlet air channel a component which is directed to the upper face of the electrical machine; and
a plurality of third laminates arranged in the outlet air channel in the end area of the housing body to deflect the outlet air in the outlet air channel away from the upper face of the electrical machine.

2. The housing attachment of claim 1, wherein the first laminates are bent at least once.

3. The housing attachment of claim 1, wherein the first laminates have a bend at their ends facing the upper face of the electrical machine so that the ends of the first laminates extend essentially parallel to the upper face of the electrical machine.

4. The housing attachment of claim 1, wherein the first laminates have a bend at their ends remote from the upper face of the electrical machine so that the ends of the first laminates extend essentially orthogonally to the upper face of the electrical machine.

5. The housing attachment of claim 1, wherein the second laminates are bent at least once.

6. The housing attachment of claim 1, wherein the second laminates have a bend at their ends facing the upper face of the electrical machine so that the ends of the second laminates extend essentially orthogonally to the upper face of the electrical machine.

7. The housing attachment of claim 1, wherein the second laminates have a bend at their ends which are remote from the upper face of the electrical machine so that the ends of the second laminates extend essentially orthogonally to the upper face of the electrical machine.

8. The housing attachment of claim 1, wherein the third laminates are bent at least once.

9. The housing attachment of claim 1, wherein the third laminates have a bend at their ends facing the upper face of the electrical machine so that the ends of the third laminates extend essentially parallel to the upper face of the electrical machine.

10. The housing attachment of claim 1, wherein the third laminates have a bend at their ends remote from the upper face of the electrical machine so that the ends of the third laminates extend essentially parallel to the upper face of the electrical machine.

11. The housing attachment of claim 1, wherein the first boundary wall is identical to the second boundary wall.

12. The housing attachment of claim 1, wherein the inlet air channel has a cross section which is larger in an area of the first air inlet opening than in an area of the first air outlet opening.

13. The housing attachment of claim 1, wherein the housing body has a second drip edge arranged in the flow direction of the outlet air in the end area of the housing body upstream of the second laminates on a third boundary wall which is opposite the second boundary wall to permit water in the end area to drip off onto the second boundary wall.

14. The housing attachment of claim 13, wherein the second drip edge is arranged in the flow direction of the outlet air upstream of the third laminates.

15. The housing attachment of claim 1, wherein the separating device is constructed in the form of a web which projects into the inlet air channel.

16. The housing attachment of claim 1, wherein the separating device is constructed in the form of a projection which projects into the inlet air channel.

17. The housing attachment of claim 16, wherein the projection is constructed in the form of a step.

18. The housing attachment of claim 1, wherein the first air inlet opening is disposed at a distance from the one of the first and second edge areas.

19. The housing attachment of claim 1, wherein the first air inlet opening extends to the one of the first and second edge areas.

20. The housing attachment of claim 1, wherein the separating device has a drain area adjacent to the first air inlet opening, said drain area extending at an inclination toward the first air inlet opening, wherein the first drip edge is arranged to permit water to drip onto the inclined drain area.

21. The housing attachment of claim 1, wherein the first drip edge is arranged in the flow direction of the inlet air in a transitional area from the first air inlet opening to the separating device.

\* \* \* \* \*